US012409845B2

(12) United States Patent
Takabatake et al.

(10) Patent No.: US 12,409,845 B2
(45) Date of Patent: Sep. 9, 2025

(54) VEHICLE DISPLAY CONTROL DEVICE, VEHICLE DISPLAY SYSTEM, VEHICLE DISPLAY CONTROL METHOD, AND NON-TRANSITORY STORAGE MEDIUM

(71) Applicant: TOYOTA JIDOSHA KABUSHIKI KAISHA, Toyota (JP)

(72) Inventors: Satoaki Takabatake, Nissin (JP); Koji Kimura, Nagoya (JP); Junji Miyazaki, Nagoya (JP); Ryo Ogata, Toyota (JP); Yuki Yoshida, Toyota (JP); Tadashi Morishita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 391 days.

(21) Appl. No.: 17/384,916

(22) Filed: Jul. 26, 2021

(65) Prior Publication Data

US 2022/0063404 A1 Mar. 3, 2022

(30) Foreign Application Priority Data

Aug. 31, 2020 (JP) ................. 2020-146390

(51) Int. Cl.
*G05D 1/00* (2024.01)
*B60K 35/00* (2006.01)
(Continued)

(52) U.S. Cl.
CPC ............. *B60K 35/00* (2013.01); *B60W 50/14* (2013.01); *B60K 35/28* (2024.01); *B60K 35/29* (2024.01);
(Continued)

(58) Field of Classification Search
CPC ..................................... B60K 35/00
See application file for complete search history.

(56) References Cited

U.S. PATENT DOCUMENTS 6,324,463 B1 * 11/2001 Patel .................... B60K 31/185
362/489
9,697,655 B1 * 7/2017 Eyhorn ................. G01M 15/14
(Continued)

FOREIGN PATENT DOCUMENTS

JP 2008-162524 A 7/2008
JP 2016-109645 A 6/2016
(Continued)

*Primary Examiner* — Vivek D Koppikar
*Assistant Examiner* — Paul W Arellano
(74) *Attorney, Agent, or Firm* — Oliff PLC

(57) ABSTRACT

A vehicle display control device includes: a driving mode acquisition section that acquires information on which of a manual driving mode or an autonomous driving mode is a driving mode; an operation intervention detection section that, in a case in which the driving mode acquired by the driving mode acquisition section is the autonomous driving mode, detects a driving operation intervention by the vehicle occupant; and a display control section that displays vicinity information of the vehicle at a display unit provided at a vehicle cabin at least in a case in which the driving mode acquired by the driving mode acquisition section is the autonomous driving mode, wherein, in a case in which a driving operation intervention is detected by the operation intervention detection section, the display control section changes background information of the vicinity information and displays the background information at the display unit.

13 Claims, 8 Drawing Sheets

(51) Int. Cl.
 B60W 50/14 (2020.01)
 *B60K 35/28* (2024.01)
 *B60K 35/29* (2024.01)
(52) U.S. Cl.
 CPC ............... *B60K 2360/172* (2024.01); *B60K 2360/1868* (2024.01); *B60K 2360/1876* (2024.01); *B60K 2360/188* (2024.01); *B60K 2360/195* (2024.01); *B60W 2050/146* (2013.01)

(56) References Cited

U.S. PATENT DOCUMENTS

| | | | | |
|---|---|---|---|---|
| 2005/0065687 | A1* | 3/2005 | Hijikata | G01S 17/931 701/41 |
| 2011/0018991 | A1* | 1/2011 | Watanabe | B60R 1/28 348/118 |
| 2014/0218506 | A1* | 8/2014 | Trombley | B62D 15/027 348/113 |
| 2017/0190286 | A1* | 7/2017 | Yavitz | B60Q 1/54 |
| 2018/0222491 | A1 | 8/2018 | Miyahara et al. | |
| 2019/0061775 | A1 | 2/2019 | Emura et al. | |
| 2019/0248287 | A1* | 8/2019 | Ono | G02B 27/0101 |
| 2019/0283770 | A1 | 9/2019 | Kubota et al. | |
| 2019/0315348 | A1 | 10/2019 | Mimura et al. | |
| 2020/0231181 | A1 | 7/2020 | Miyahara et al. | |
| 2020/0247319 | A1* | 8/2020 | Shimizu | G08G 1/16 |
| 2020/0339147 | A1 | 10/2020 | Hayakawa et al. | |
| 2022/0297717 | A1 | 9/2022 | Ono et al. | |

FOREIGN PATENT DOCUMENTS

| | | |
|---|---|---|
| JP | 2017-087873 A | 5/2017 |
| JP | 2017-178267 A | 10/2017 |
| JP | 2019-119262 A | 7/2019 |
| JP | 2019-138773 A | 8/2019 |
| JP | 2019-156265 A | 9/2019 |
| JP | 2019-182305 A | 10/2019 |
| JP | 2020-064402 A | 4/2020 |
| WO | 2017/072953 A1 | 5/2017 |
| WO | 2018/025414 A1 | 2/2018 |

* cited by examiner

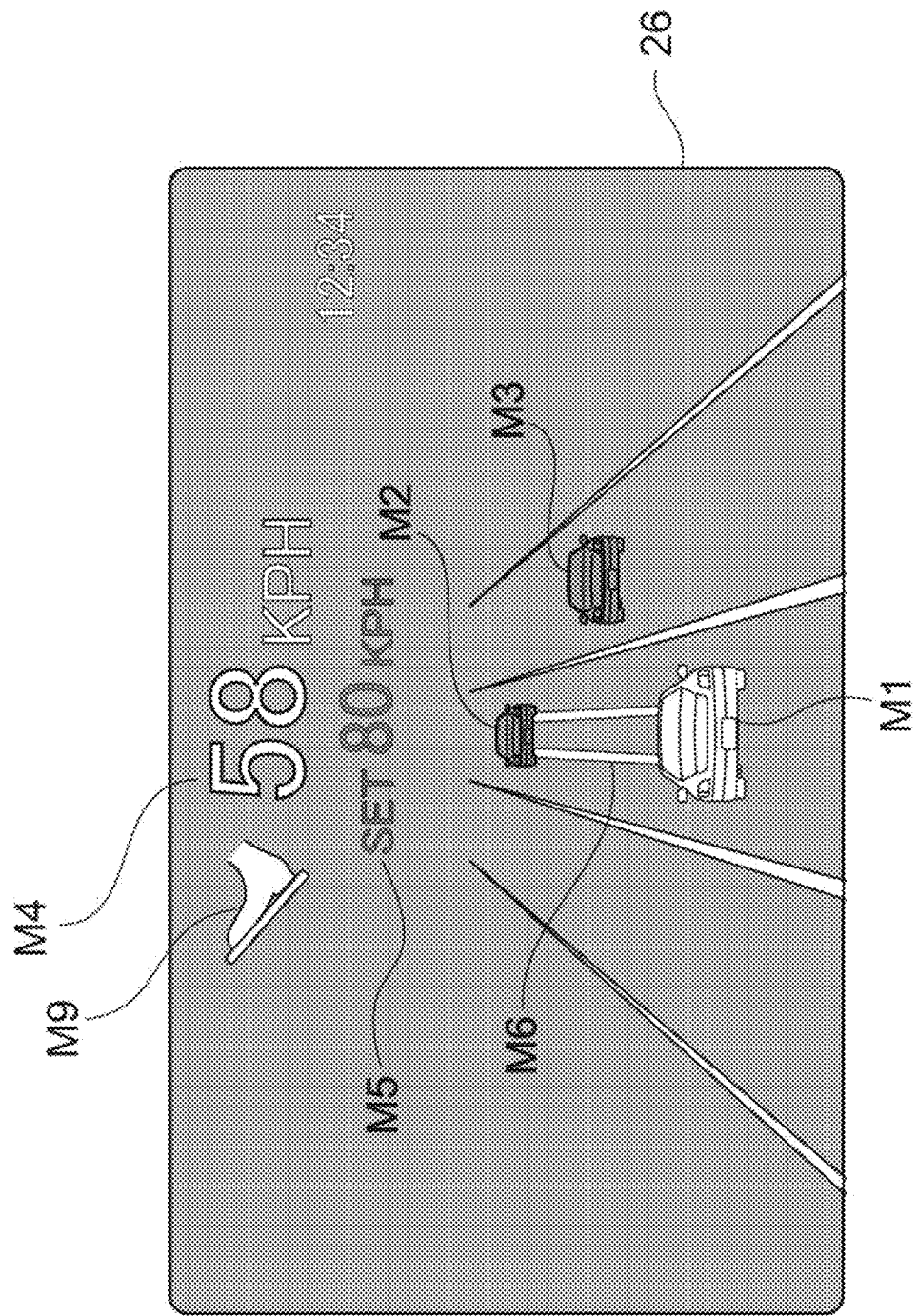

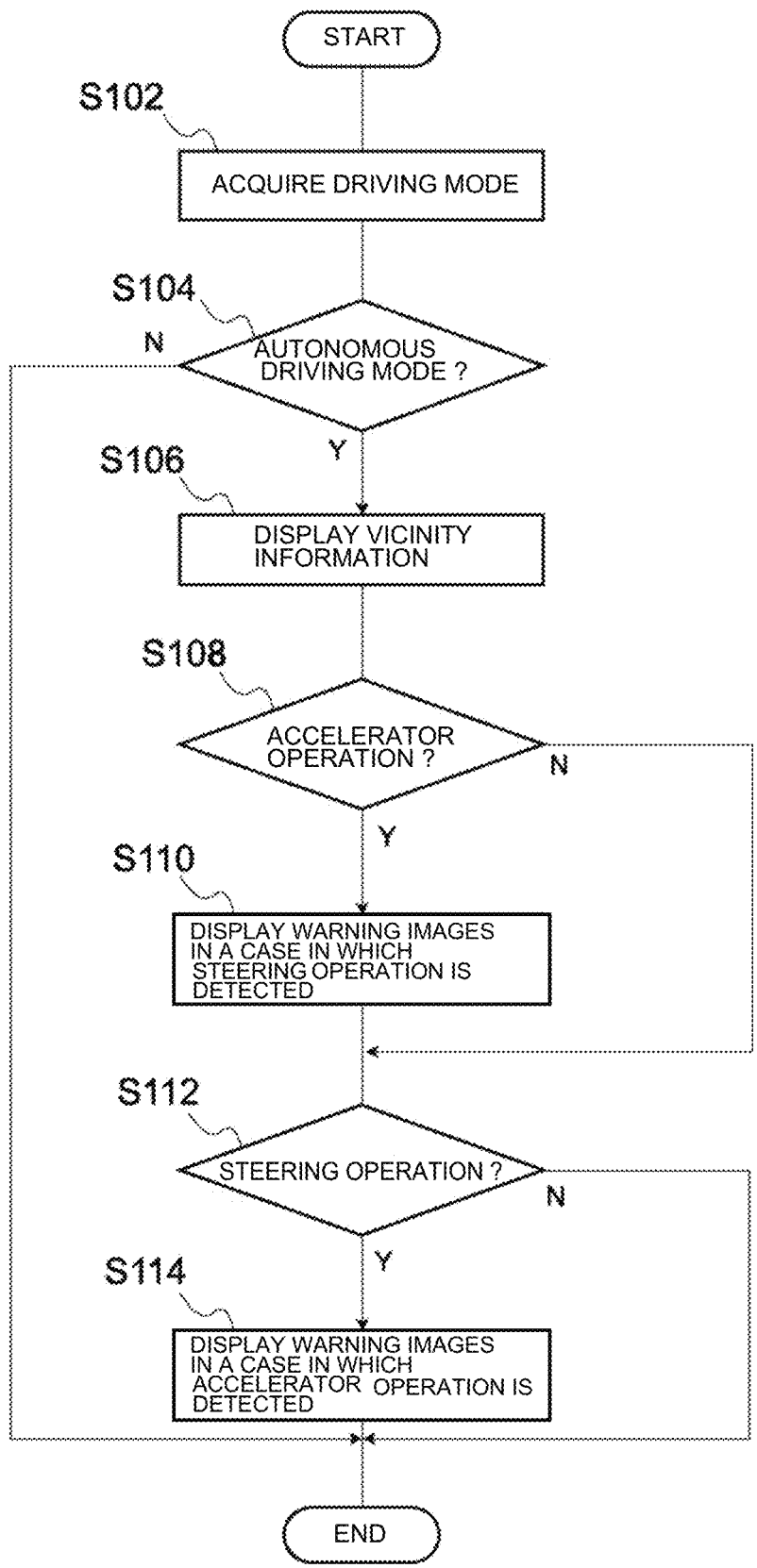

VEHICLE DISPLAY CONTROL DEVICE, VEHICLE DISPLAY SYSTEM, VEHICLE DISPLAY CONTROL METHOD, AND NON-TRANSITORY STORAGE MEDIUM

CROSS-REFERENCE TO RELATED APPLICATION

This application is based on and claims priority under 35 USC 119 from Japanese Patent Application No. 2020-146390 filed on Aug. 31, 2020, the disclosure of which is incorporated by reference herein.

BACKGROUND

Technical Field

The present disclosure relates to a display control device for a vehicle, a display system for a vehicle, a display control method for a vehicle, and a non-transitory storage medium.

Related Art

Japanese Patent Application Laid-Open (JP-A) No. 2019-119262 discloses a display device that, in a vehicle capable of running in a plural number of driving modes, displays an image giving notice of a change in driving mode of the vehicle in a display region to the front of a driver seat.

A configuration is possible in which, when a vehicle occupant performs a driving operation during autonomous driving, driving operations by the vehicle occupant are given priority. In this configuration, when a vehicle occupant unintentionally performs a driving operation intervention (an override operation) during autonomous driving, some driving operations may be transferred to the vehicle occupant while the vehicle occupant is not ready.

SUMMARY

The present disclosure provides a vehicle display control device, a vehicle display system, a vehicle display control method and a non-transitory storage medium that may inform a vehicle occupant of a driving operation intervention during autonomous driving.

A vehicle display control device according to a first aspect of the present disclosure includes: a driving mode acquisition section that acquires information on which of a manual driving mode or an autonomous driving mode is a driving mode, a vehicle running via driving operations by a vehicle occupant in the manual driving mode, and the vehicle running independent of driving operations by the vehicle occupant in the autonomous driving mode; an operation intervention detection section that, in a case in which the driving mode acquired by the driving mode acquisition section is the autonomous driving mode, detects a driving operation intervention by the vehicle occupant; and a display control section that displays vicinity information of the vehicle at a display unit provided at a vehicle cabin at least in a case in which the driving mode acquired by the driving mode acquisition section is the autonomous driving mode, wherein, in a case in which a driving operation intervention is detected by the operation intervention detection section, the display control section changes background information of the vicinity information and displays the background information at the display unit.

In the vehicle display control device according to the first aspect of the present disclosure, the driving mode acquisition section acquires the driving mode of the vehicle. This driving mode acquisition section acquires information on which driving mode the vehicle is in, of a manual driving mode in which the vehicle runs via driving operations by a vehicle occupant and an autonomous driving mode in which the vehicle runs independent of driving operations by the vehicle occupant. At least in a case in which the driving mode acquired by the driving mode acquisition section is the autonomous driving mode, the display control section displays vicinity information of the vehicle at the display unit provided in the cabin. Therefore, in the autonomous driving mode, the vehicle occupant may check vicinity information of the vehicle by looking at the display unit.

The operation intervention detection section detects a driving operation intervention by the vehicle occupant in the autonomous driving mode. In a case in which a driving operation intervention is detected by the operation intervention detection section, the display control section changes background information of the vicinity information of the vehicle that is displayed at the display unit. Therefore, if the vehicle occupant unintentionally performs a driving operation during running in the autonomous driving mode, because a background of the display unit changes, the driving operation intervention may be reported to the vehicle occupant visually. Thus, disturbance of the comfort of another vehicle occupant may be suppressed compared to a configuration that frequently reports to the vehicle occupant by voice messages.

In a vehicle display control device according to a second aspect of the present disclosure, in the first aspect, the operation intervention detection section may detect, as a driving operation intervention, at least one of a steering operation by the vehicle occupant or an accelerator operation by the vehicle occupant.

In the vehicle display control device according to the second aspect of the present disclosure, the background of the display unit changes in a case in which at least of a steering operation of an accelerator operation is performed by the vehicle occupant. Therefore, the vehicle occupant may understand that one or both of the steering wheel and the accelerator has been operated.

In a vehicle display control device according to a third aspect of the present disclosure, in the second aspect, the display control section may display a planned running route of the vehicle at the display unit and, in a case in which a steering operation is detected by the operation intervention detection section, the display control section hides display of the planned running route.

In the vehicle display control device according to the third aspect of the present disclosure, because the display control section displays the planned running route at the display unit, the vehicle occupant may understand movements of the vehicle in the autonomous driving mode. Because the display control section stops display of the planned running route when the vehicle occupant operates the steering wheel, the vehicle occupant may be made aware of the steering operation intervention.

In a vehicle display control device according to a fourth aspect of the present disclosure, in the third aspect, the planned running route may be displayed superposed on an image of a driving lane of the vehicle.

In a vehicle display control device according to a fifth aspect of the present disclosure, in any one of the second to fourth aspects, the display control section may display a preceding vehicle at the display unit, and in a case in which an accelerator operation is detected by the operation intervention detection section, the display control section tones down a color of the preceding vehicle and displays the preceding vehicle.

In the vehicle display control device according to the fifth aspect of the present disclosure, because the display control section displays a vehicle in front at the display unit, the vehicle occupant may understand at a glance that there is a vehicle in front in the autonomous driving mode. Because the display control section tones down the color of the vehicle in front when the accelerator is operated, the vehicle occupant may be made aware that an accelerator operation has been performed.

In a vehicle display control device according to a sixth aspect of the present disclosure, in any one of the second to fifth aspects, the display control section may display speed marks at the display unit, a spacing of the speed marks changing in accordance with a speed of the vehicle, and in a case in which an accelerator operation is detected by the operation intervention detection section, the display control section hides display of the speed marks.

In the vehicle display control device according to the sixth aspect of the present disclosure, because the display control section displays the speed marks at the display unit, the vehicle occupant may check the speed of the vehicle in the autonomous driving mode just by checking the spacing of the speed marks. Because the display control section stops display of the speed marks when the accelerator is operated, the vehicle occupant may be made aware that an accelerator operation has been performed.

In a vehicle display control device according to a seventh aspect of the present disclosure, any one of the second to sixth aspects may further comprising: a warning display section that, in a case in which at least one of a steering operation or an accelerator operation is detected by the operation intervention detection section, displays a warning image representing the driving operation intervention at the display unit.

In the vehicle display control device according to the seventh aspect of the present disclosure, because the warning image is displayed at the display unit by the warning display section, the occurrence of a driving operation intervention may be reported to the vehicle occupant effectively.

In a vehicle display control device according to an eighth aspect of the present disclosure, in the seventh aspect, the warning display section may display different warning images in a case in which a steering operation is detected by the operation intervention detection section and in a case in which an accelerator operation is detected.

In the vehicle display control device according to the eighth aspect of the present disclosure, the vehicle occupant may understand the kind of driving operation just by seeing the warning image.

A vehicle display system according to a ninth aspect of the present disclosure includes: the vehicle display control device according to any one of the first to eighth aspects; and the display unit being provided at the vehicle cabin, vicinity information of the vehicle being displayed at the display unit.

A vehicle display control method according to a tenth aspect of the present disclosure includes: acquiring information on which of a manual driving mode or an autonomous driving mode is a driving mode, a vehicle running via driving operations by a vehicle occupant in the manual driving mode, and the vehicle running independent of driving operations by the vehicle occupant in the autonomous driving mode; in a case in which the acquired driving mode is the autonomous driving mode, detecting a driving operation intervention by the vehicle occupant; at least in a case in which the acquired driving mode is the autonomous driving mode, displaying vicinity information of the vehicle at a display unit provided at a vehicle cabin; and in a case in which a driving operation intervention is detected, changing background information of the vicinity information and displaying the background information at the display unit.

A non-transitory storage medium according to an eleventh aspect of the present disclosure stores a program causing a computer to execute processing including: acquiring information on which of a manual driving mode or an autonomous driving mode is a driving mode, a vehicle running via driving operations by a vehicle occupant in the manual driving mode, and the vehicle running independent of driving operations by the vehicle occupant in the autonomous driving mode; in a case in which the acquired driving mode is the autonomous driving mode, detecting a driving operation intervention by the vehicle occupant; at least in a case in which the acquired driving mode is the autonomous driving mode, displaying vicinity information of the vehicle at a display unit provided at a vehicle cabin; and in a case in which a driving operation intervention is detected, changing background information of the vicinity information and displaying the background information at the display unit.

The vehicle display control device, vehicle display control method and non-transitory storage medium of the present disclosure may inform a vehicle occupant of a driving operation intervention during autonomous driving.

BRIEF DESCRIPTION OF THE DRAWINGS

An exemplary embodiment of the present disclosure will be described in detail based on the following figures, wherein:

FIG. 7 is a view illustrating an example of a display screen during autonomous driving according to a variant example, which is a view of a state in which an accelerator operation intervention has been performed.

FIG. 8 is a flowchart illustrating an example of a flow of display processing according to the exemplary embodiment.

DETAILED DESCRIPTION

A vehicle display control device 10 according to an exemplary embodiment is employed in a vehicle 12. The vehicle 12 is described with reference to the drawings. As an example, the vehicle 12 according to the present exemplary embodiment is configured to be switchable between autonomous driving and manual driving.

Figure 1:
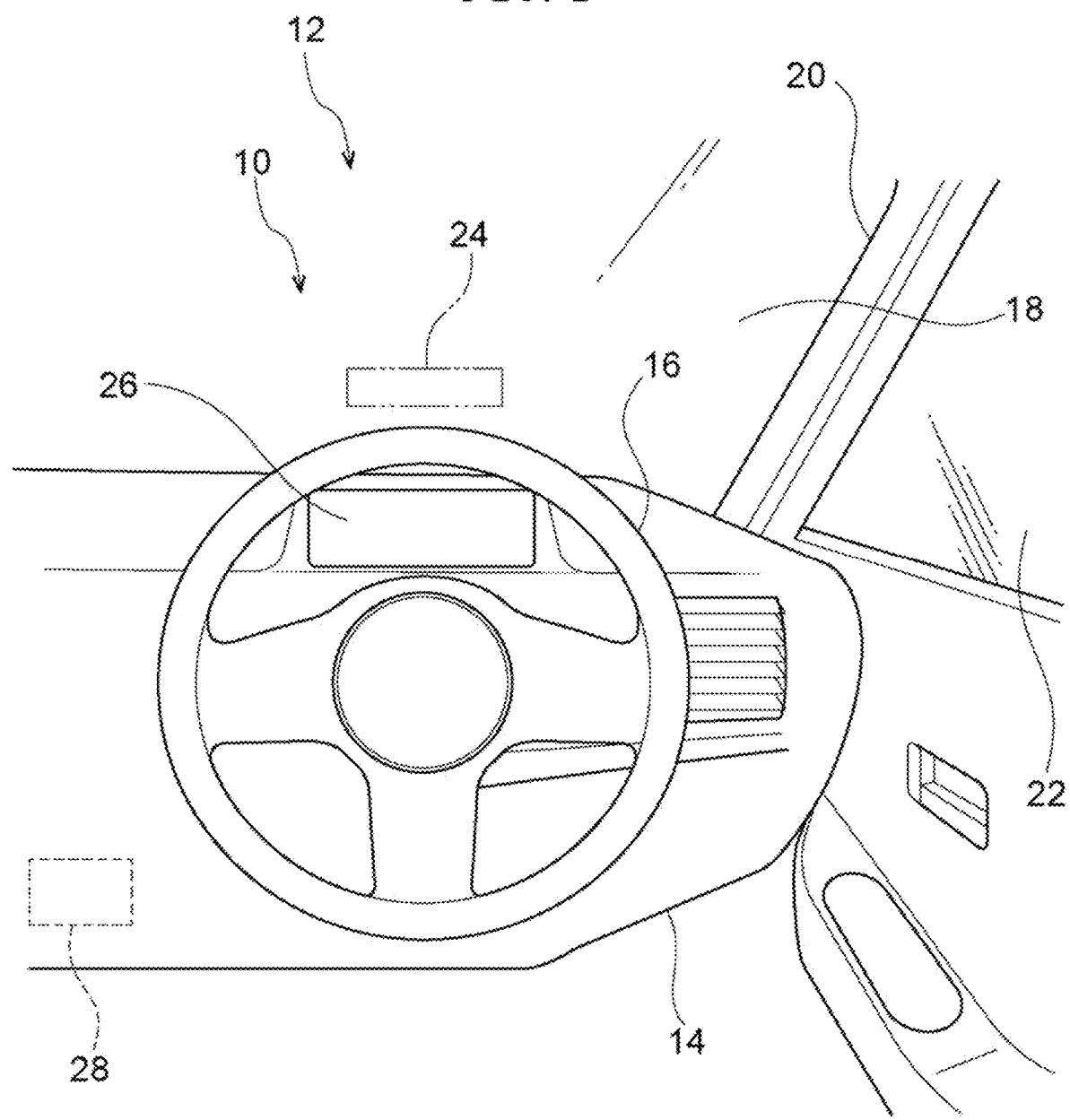
FIG. 1 is a schematic view schematically illustrating a state in which a cabin front portion of a vehicle according to an exemplary embodiment is viewed from the vehicle rear side.

As illustrated in FIG. 1, an instrument panel 14 is provided at a front portion of a cabin interior of the vehicle 12. The instrument panel 14 extends in the vehicle width direction, and a steering wheel 16 is provided at the vehicle right side of the instrument panel 14. That is, the present exemplary embodiment is an example of a right-hand drive car in which the steering wheel 16 is provided at the right side and a driver seat is specified to be at the vehicle right side.

A windshield glass 18 is provided at a front end portion of the instrument panel 14. The windshield glass 18 extends in the vehicle vertical direction and the vehicle width direction, dividing the cabin interior from the cabin exterior.

A vehicle right side end portion of the windshield glass 18 is fixed to a vehicle right side front pillar 20. The front pillar 20 extends in the vehicle vertical direction, and the windshield glass 18 is fixed to a vehicle width direction inner side end portion of the front pillar 20. A front end portion of a front side glass 22 is fixed to a vehicle width direction outer side end portion of the front pillar 20. A vehicle left side end portion of the windshield glass 18 is fixed to a vehicle left side front pillar, which is not illustrated in the drawings.

Figure 2:
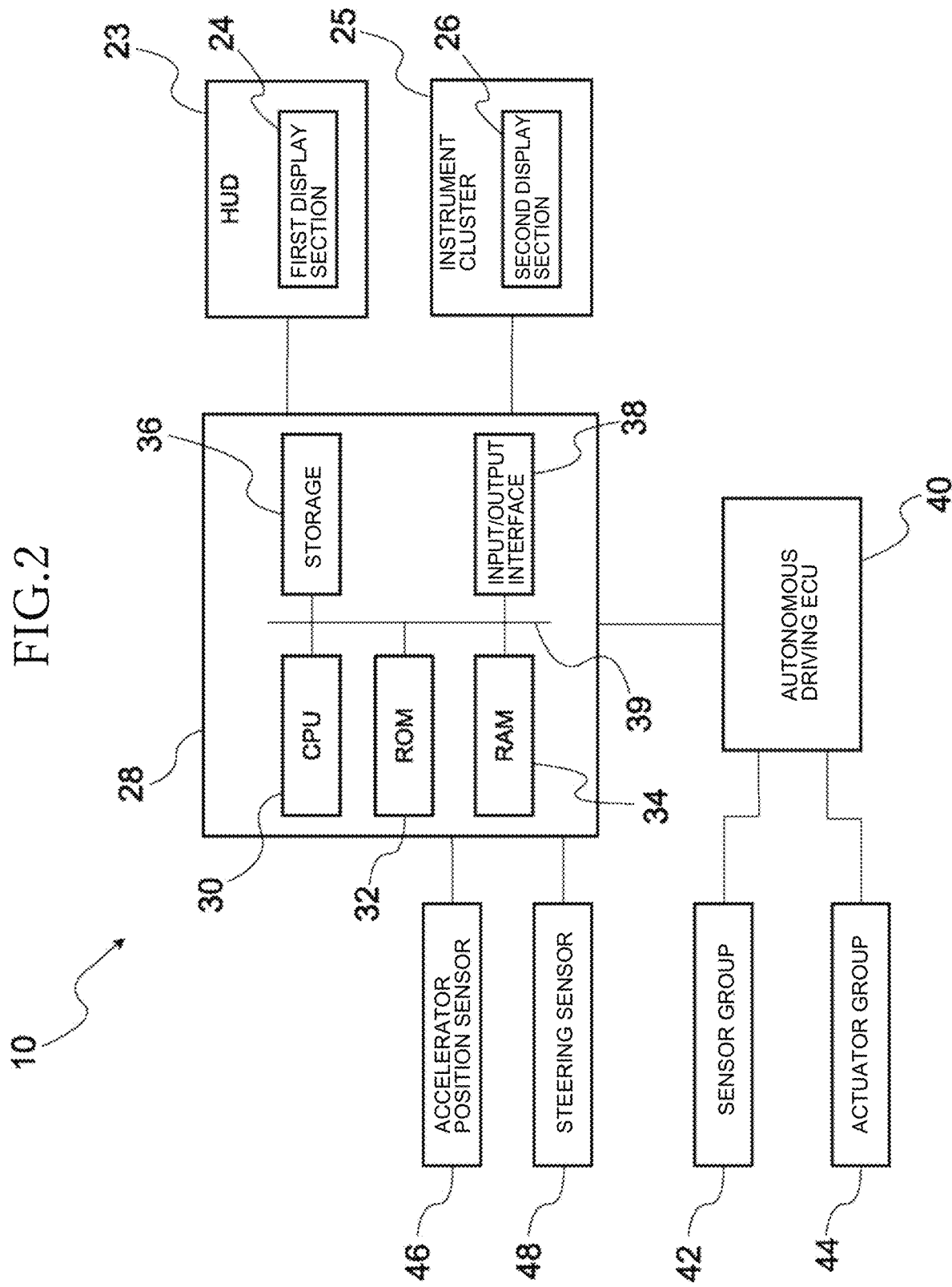
FIG. 2 is a block diagram illustrating hardware structures of a vehicle display control device according to the exemplary embodiment.

A first display section 24 is provided at the windshield glass 18. The first display section 24 is constituted by a projection surface that is projected onto by a head-up display device 23, which is illustrated in FIG. 2. Specifically, the head-up display device 23 is provided at the vehicle front side relative to the instrument panel 14, and the head-up display device 23 is structured to project images onto the first display section 24 of the windshield glass 18.

A second display section 26 is provided at the vehicle lower side relative to the first display section 24. The second display section 26 is a display section that is displayed in an instrument cluster 25. The instrument cluster 25 is disposed at the instrument panel 14 to the vehicle front of the driver seat. The first display section 24 and the second display section 26 are provided at positions that are viewable by a driver. The first display section 24 and second display section 26 correspond to a display unit of the present disclosure. The vehicle display system of the present disclosure is constituted by the vehicle display control device 10, the first display section 24 and the second display section 26.

—Hardware Structures of the Vehicle Display Control Device 10—

As illustrated in FIG. 2, the vehicle display control device 10 according to the present exemplary embodiment includes an electronic control unit (ECU) 28.

The ECU 28 includes a central processing unit (CPU or processor) 30, read-only memory (ROM) 32, random access memory (RAM) 34, storage 36 and an input/output interface 38. These structures are connected to be capable of communicating with one another via an internal bus 39.

The CPU 30 is a central arithmetic processing unit that executes various programs and controls respective parts. That is, the CPU 30 reads a program from the ROM 32 or the storage 36, and executes the program using the RAM 34 as a workspace. The CPU 30 performs control of the structures described above and various kinds of computational processing in accordance with programs recorded in the ROM 32 or the storage 36.

The ROM 32 stores various programs and various kinds of data. The RAM 34 serves as a workspace, temporarily memorizing programs and data. The storage 36 is a non-transitory recording medium structured by a hard disk drive (HDD) or solid state drive (SSD). The storage 36 stores various programs, including an operating system, and various kinds of data. In the present exemplary embodiment, the ROM 32 or the storage 36 stores a display program and the like for implementing display processing. Various input/output devices are connected to the input/output interface 38.

The ECU 28 is connected to an autonomous driving ECU 40. Similarly to the ECU 28, the autonomous driving ECU 40 includes a CPU, ROM, RAM, storage and an input/output interface, which are not illustrated in the drawings.

A sensor group 42 and an actuator group 44 are connected to the autonomous driving ECU 40. The sensor group 42 detects current states of the vehicle. The actuator group 44 controls running of the vehicle. The sensor group 42 includes plural sensors among various sensors, such as cameras, radar, lidar (light detection and ranging or laser imaging detection and ranging), a GPS (global positioning system) sensor and so forth. The cameras image the vicinity of the vehicle. The radar detects distances and directions of objects in the vicinity of the vehicle with electromagnetic waves. The lidar detects distances and directions of objects in the vicinity of the vehicle with laser light. The GPS sensor detects a current position of the vehicle. The sensor group 42 may also include sensors that detect states of vehicle occupants. For example, the sensor group 42 may include biosensors that detect pulse rates, levels of alertness and the like of vehicle occupants.

The actuator group 44 includes acceleration and braking actuators that regulate acceleration and deceleration of the vehicle, and a steering actuator that drives a steering apparatus of the vehicle. The autonomous driving ECU 40 implements autonomous driving of the vehicle by controlling operations of the actuator group 44 in accordance with current states of the vehicle detected by the sensor group 42. A planned route representing a route along which the vehicle plans to run is memorized in a memory section of the autonomous driving ECU 40. The autonomous driving ECU 40 causes the vehicle 12 to run along the planned route memorized in the memory section.

The ECU 28 is connected to an accelerator position sensor 46 and a steering sensor 48. The accelerator position sensor 46 is a sensor that detects positions of an accelerator pedal, which is not illustrated in the drawings, that is provided at a lower portion of the driver seat. The steering sensor 48 is a sensor that detects loads applied to the steering wheel 16 by a vehicle occupant. That is, the steering sensor 48 according to the present exemplary embodiment does not detect loads when the steering wheel 16 is being operated by the autonomous driving ECU 40 during autonomous driving, but detects loads when the vehicle occupant operates the steering wheel 16.

—Functional Structures of the Vehicle Display Control Device 10—

The vehicle display control device 10 uses the hardware resources described above to realize various functions. The functional structures realized by the vehicle display control device 10 are described with reference to FIG. 3.

Figure 3:
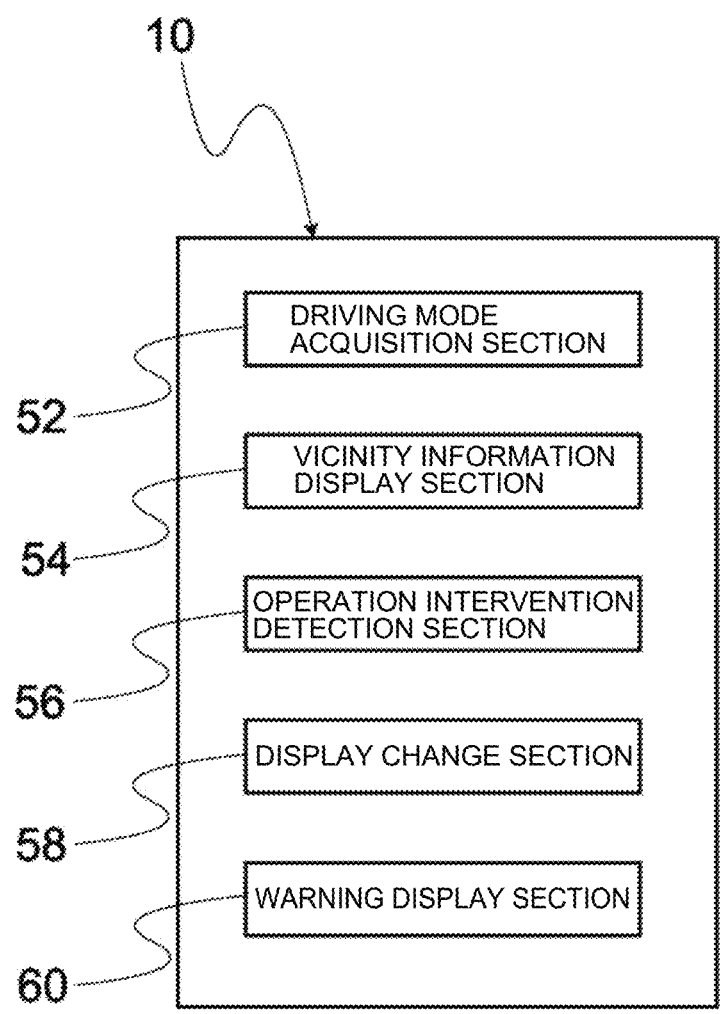
FIG. 3 is a block diagram illustrating functional structures of the vehicle display control device according to the exemplary embodiment.

As illustrated in FIG. 3, the vehicle display control device 10 includes, as functional structures, a driving mode acquisition section 52, a vicinity information display section 54, an operation intervention detection section 56, a display change section 58 and a warning display section 60. The functional structures are realized by the CPU 30 of the ECU 28 reading and executing a program. Functions of a display control section of the present disclosure include the functions of the vicinity information display section 54 and the display change section 58.

The driving mode acquisition section 52 acquires a driving mode of the vehicle 12, which is either of a manual driving mode and an autonomous driving mode. The manual driving mode according to the present exemplary embodiment signifies a driving mode in which the vehicle 12 runs via driving operations by a vehicle occupant. The autonomous driving mode according to the present exemplary embodiment signifies a driving mode in which the vehicle 12 runs independent of operations of the steering wheel 16 by the vehicle occupant and accelerator operations. The driving mode acquisition section 52 may acquire information relating to the driving mode on the basis of, for example, signals from the autonomous driving ECU 40.

At least when the driving mode acquired by the driving mode acquisition section 52 is the autonomous driving mode, the vicinity information display section 54 constituting the display control section displays vicinity information of the vehicle 12 at the first display section 24 and second display section 26 provided in the cabin. More specifically, the vicinity information display section 54 acquires signals from the sensor group 42 and displays vicinity information of the vehicle 12 based on the acquired signals at the first display section 24 and second display section 26.

Figure 4:
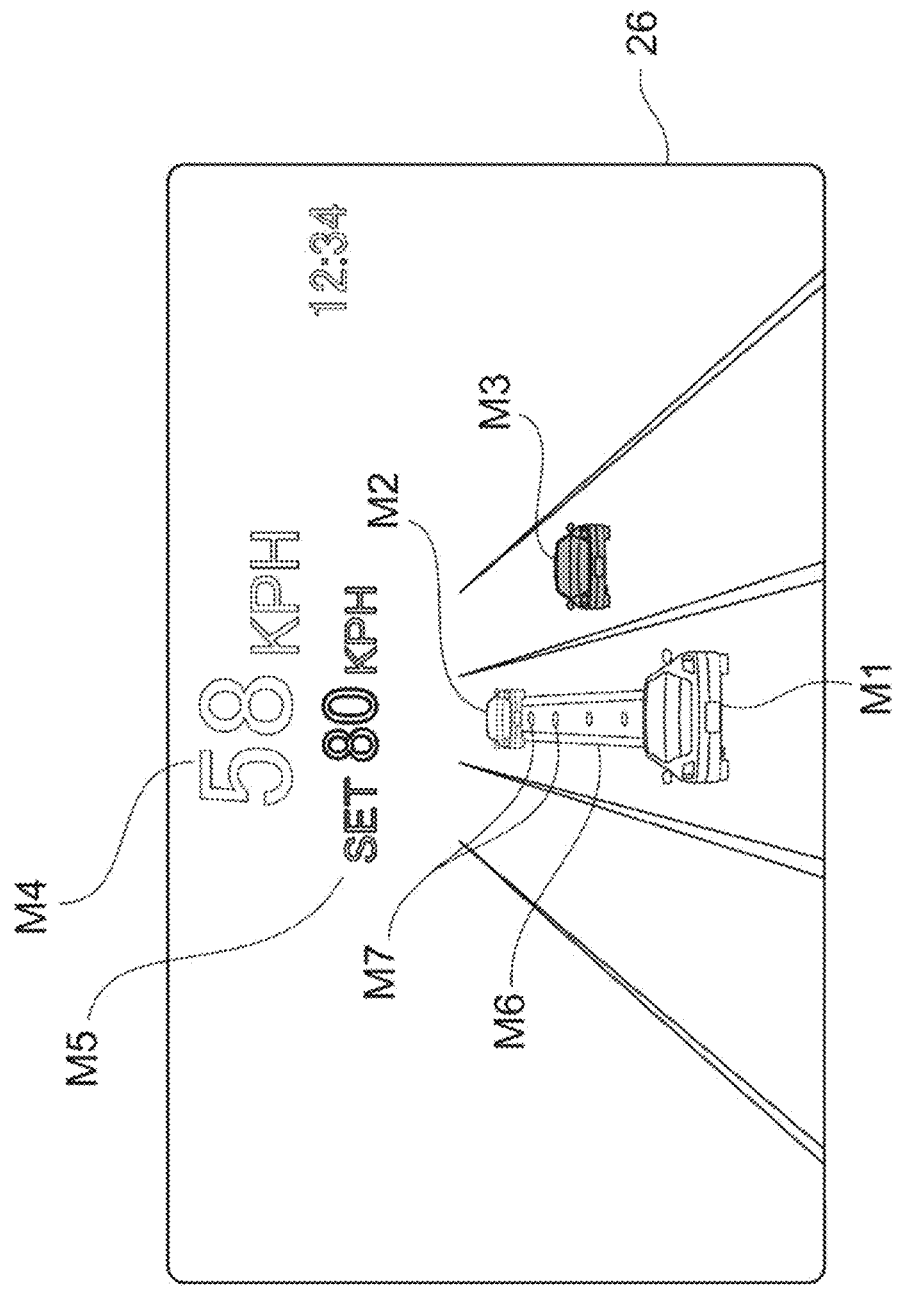
FIG. 4 is a view illustrating an example of a display screen at a second display unit during autonomous driving, which is a view of a state in which there is no steering operation intervention or accelerator operation intervention.

FIG. 4 illustrates a portion of a display screen of the second display section 26 in the autonomous driving mode. As illustrated in FIG. 4, in the autonomous driving mode, a present vehicle image M1 representing the vehicle 12 is displayed at a lower portion of the second display section 26. A preceding vehicle image M2 representing a vehicle in front that is running ahead of the vehicle 12 is also displayed. A vicinity vehicle image M3 representing a nearby vehicle that is running in a lane adjacent to a lane in which the vehicle 12 is running is also displayed. The preceding vehicle image M2 and vicinity vehicle image M3 are displayed at the second display section 26 by the functioning of the vicinity information display section 54. When there is no vehicle in front or nearby vehicle within a predetermined range of the vehicle 12, the preceding vehicle image M2 and vicinity vehicle image M3 are not displayed at the second display section 26.

An image M4 indicating a current speed of the vehicle 12 is displayed at an upper portion of the second display section 26. An image M5 indicating a set speed is displayed below the image M4.

Trajectory images M6 illustrating a planned running route of the vehicle 12 and speed marks M7 corresponding to the speed of the vehicle 12 are displayed between the present vehicle image M1 and the preceding vehicle image M2. The trajectory images M6 are displayed in substantial strip shapes. When the vehicle 12 is proceeding straight ahead, the trajectory images M6 are displayed in substantially linear shapes in the vertical direction. Although not illustrated in the drawings, when the vehicle 12 is turning left or right and when the vehicle 12 is curving along a bend in the road, the trajectory images M6 are displayed in states that curve along the planned running route of the vehicle 12. The trajectory images M6 are displayed at the second display section 26 by the functioning of the vicinity information display section 54.

A plural number of the speed marks M7 are displayed spaced apart in a state in which the speed marks M7 are superposed with the trajectory images M6. In FIG. 4, four of the speed marks M7 are displayed. The speed marks M7 are displayed such that spacings thereof change in accordance with speeds of the vehicle 12. For example, when the speed of the vehicle 12 is a lower speed than in FIG. 4, the speed marks M7 are displayed with smaller spacings. Conversely, when the speed of the vehicle 12 is a higher speed than in FIG. 4, the speed marks M7 are displayed with larger spacings. The speed marks M7 are displayed at the second display section 26 by the functioning of the vicinity information display section 54.

The first display section 24 displays similar images to the second display section 26. In the present exemplary embodiment, because a display region of the first display section 24 is narrower than a display region of the second display section 26, only some of the images in the second display section 26 are displayed in the first display section 24. For example, the preceding vehicle image M2, trajectory images M6 and speed marks M7 are displayed in the first display section 24.

When the driving mode acquired by the driving mode acquisition section 52 is the autonomous driving mode, the operation intervention detection section 56 illustrated in FIG. 3 detects driving operation interventions by the vehicle occupant. That is, the operation intervention detection section 56 functions only when the driving mode is the autonomous driving mode and does not function when the driving mode is the manual driving mode. In the autonomous driving mode, when the operation intervention detection section 56 detects that the accelerator pedal has moved from an initial position thereof on the basis of signals from the accelerator position sensor 46, the operation intervention detection section 56 determines that an accelerator operation intervention by the vehicle occupant has occurred. Further, in the autonomous driving mode, when the operation intervention detection section 56 detects that the vehicle occupant has applied a load to the steering wheel 16 on the basis of signals from the steering sensor 48, the operation intervention detection section 56 determines that a steering operation intervention by the vehicle occupant has occurred.

When a driving operation intervention by the vehicle occupant is detected by the operation intervention detection section 56, the display change section 58 constituting the display control section changes a background color of the vicinity information of the vehicle 12 that is displayed at the first display section 24 and the second display section 26.

Figure 5:
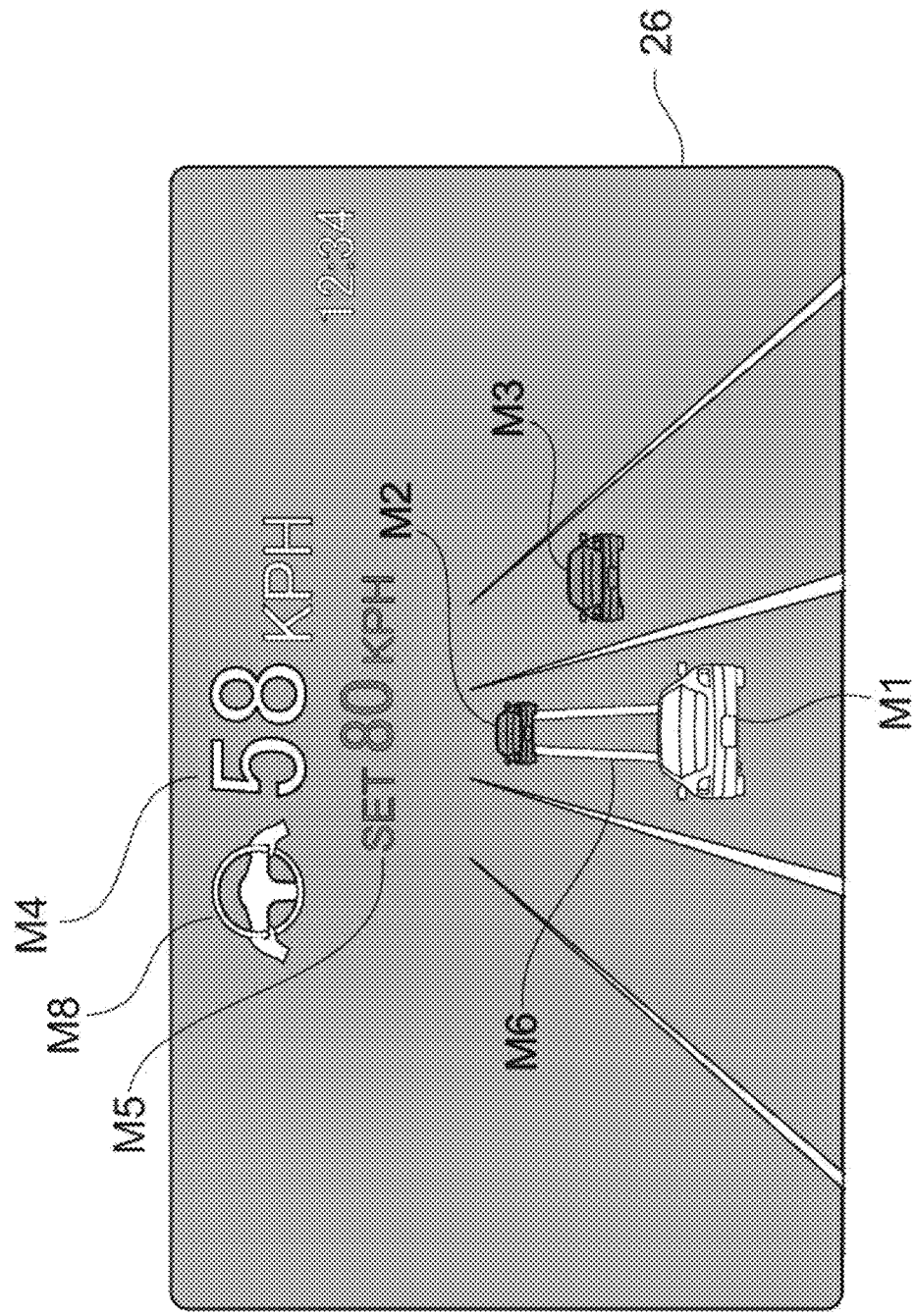
FIG. 5 is a view illustrating an example of a display screen at the second display unit during autonomous driving, which is a view of a state in which an accelerator operation intervention has been performed.

As an example in the present exemplary embodiment, when the operation intervention detection section 56 detects a driving operation intervention, the display change section 58 changes the background color of the first display section 24 and the second display section 26 as illustrated in FIG. 5, from the state illustrated in FIG. 4. The background color is not particularly limited; the display change section 58 changes the background color such that the vehicle occupant may be alerted.

For example, as illustrated in FIG. 4, in a state in which no driving operation intervention has been detected, the background color of the second display section 26 is in an uncolored state. In contrast, as illustrated in FIG. 5, when a driving operation intervention has been detected, the display change section 58 tones down the background color of the second display section 26 to a gray. In this case, the present vehicle image M1 and lanes are not toned down; only the surrounding color is toned down.

When an accelerator operation is detected by the operation intervention detection section 56, the display change section 58 displays the vehicle in front with a toned down color. In addition, when the accelerator operation is detected by the operation intervention detection section 56, the display change section 58 stops display of the speed marks M7.

FIG. 5 is a display screen of the second display section 26 in a state in which an accelerator operation intervention has been performed during autonomous driving. As illustrated in FIG. 5, the color of the preceding vehicle image M2 is toned down by the display change section 58. The preceding vehicle image M2 being displayed in a toned down color displays the fact that a driving assistance function that automatically regulates the distance from the vehicle in front has stopped operating.

In addition, the speed marks M7 that are displayed superposed with the trajectory images M6 of the planned running route are hidden by the display change section 58. This displays the fact that, because the vehicle occupant has a foot on the accelerator pedal, the speed of the vehicle 12 is not being controlled.

When an accelerator operation intervention is performed during autonomous driving, the display change section 58 tones down the image M5 of the set speed. This displays the fact that a set speed function has stopped operating.

Figure 6:
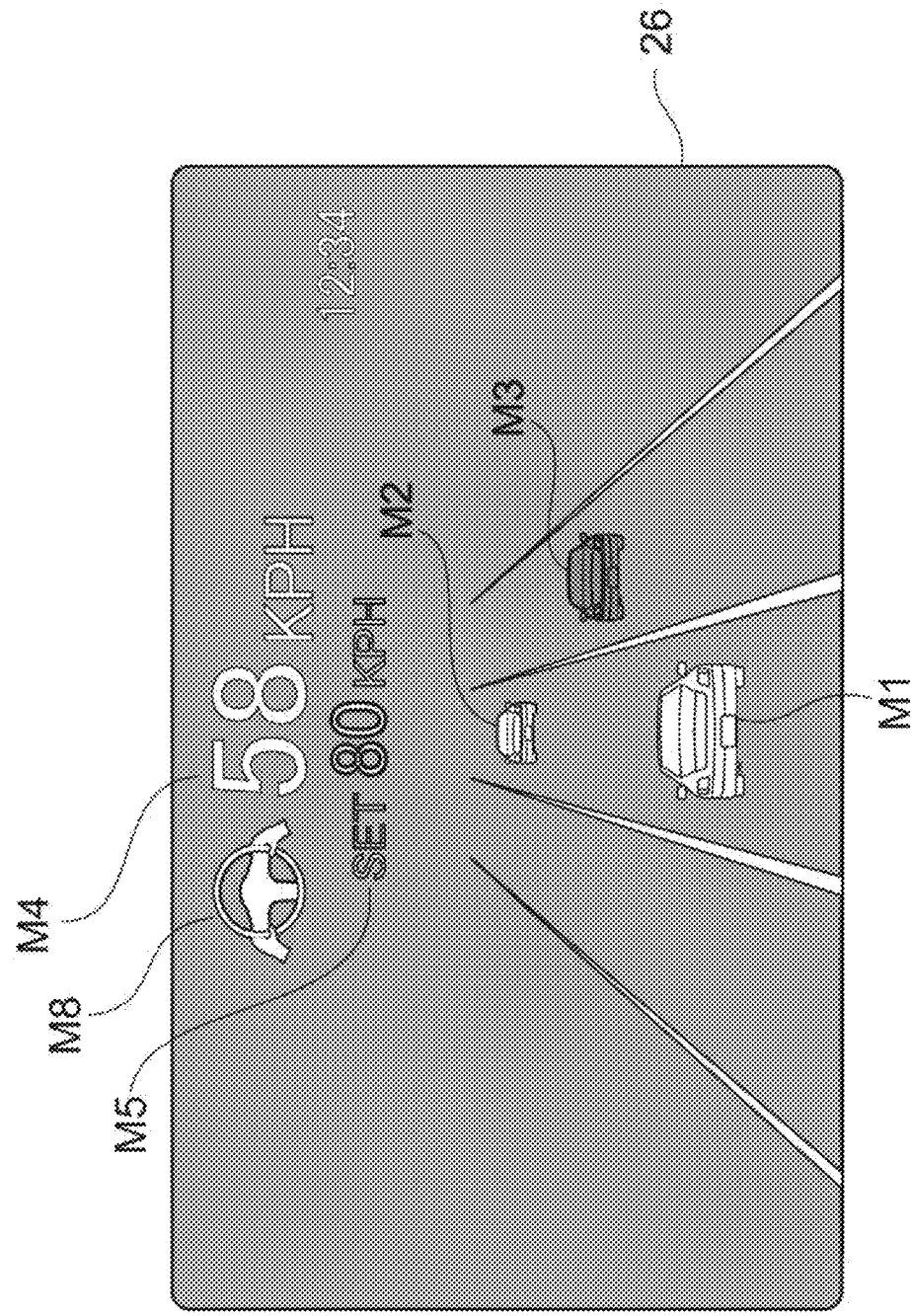
FIG. 6 is a view illustrating an example of a display screen at the second display unit during autonomous driving, which is a view of a state in which a steering operation intervention has been performed.

When a steering operation intervention is detected by the operation intervention detection section 56, the display change section 58 stops display of the trajectory images M6. FIG. 6 is a display screen of the second display section 26 in a state in which a steering operation intervention has been performed during autonomous driving. As illustrated in FIG. 6, the trajectory images M6 are hidden by the display change section 58. In association with the hiding of the trajectory images M6, the speed marks M7 are also hidden.

In FIG. 6, the preceding vehicle image M2 is not toned down but displayed the same as in FIG. 4. That is, because no accelerator operation intervention has been performed in FIG. 6, the driving assistance function that regulates the distance from the vehicle in front is operating. Meanwhile, because the steering wheel 16 is being operated, the fact that a function for running along the planned running route has stopped operating is displayed.

When a steering operation intervention or an accelerator operation intervention is detected by the operation intervention detection section 56, the warning display section 60 illustrated in FIG. 3 displays a warning representing the driving operation intervention at the first display section 24 and the second display section 26.

As illustrated in FIG. 5 and FIG. 6, when one or both of a steering operation intervention and an accelerator operation intervention is performed, a warning image M8 is displayed at the left side of the image M4 displaying the speed of the vehicle 12. The warning image M8 according to the present exemplary embodiment is, for example, an image representing a state in which the steering wheel is being held, but this is not limiting. For example, the variant example illustrated in FIG. 7 may be displayed.

Variant Example

FIG. 7 illustrates a variant example of the display screen of the second display section 26 in a state in which an accelerator operation intervention has been performed during autonomous driving. As illustrated in FIG. 7, the preceding vehicle image M2 and the set speed image M5 are displayed toned down by the display change section 58. The warning display section 60 displays a warning image M9 at the left side of the image M4 illustrating the speed of the vehicle 12. The warning image M9 is an image of a foot stepping on the accelerator pedal. Thus, the warning display section 60 may implement different displays when a steering operation is detected by the operation intervention detection section 56 and when an accelerator operation is detected.

—Operation—

Now, operation of the present exemplary embodiment is described.

Example of Display Processing

FIG. 8 is a flowchart illustrating an example of flow of the display processing by the vehicle display control device 10. This display processing is implemented by the CPU 30 of the ECU 28 reading a program from the ROM 32 or storage 36, loading the program into the RAM 34, and executing the program.

As illustrated in FIG. 8, in step S102, the CPU 30 acquires the driving mode. More specifically, by the functioning of the driving mode acquisition section 52, the CPU 30 acquires the driving mode of the vehicle 12, which is either of the manual driving mode and the autonomous driving mode.

In step S104, the CPU 30 makes a determination as to whether the driving mode of the vehicle 12 is the autonomous driving mode. When the driving mode of the vehicle 12 acquired by the driving mode acquisition section 52 is the autonomous driving mode, the result of the determination in step S104 is affirmative and the CPU 30 proceeds to the processing of step S106. On the other hand, when the driving mode of the vehicle 12 acquired by the driving mode acquisition section 52 is the manual driving mode, the CPU 30 ends the display processing.

In step S106, the CPU 30 displays vicinity information. More specifically, by the functioning of the vicinity information display section 54, the CPU 30 acquires signals from the sensor group 42 and displays vicinity information of the vehicle 12 based on the acquired signals at the first display section 24 and second display section 26. For example, in step S106, the CPU 30 displays the present vehicle image M1, preceding vehicle image M2, vicinity vehicle image M3, trajectory images M6, speed marks M7 and the like at the second display section 26 as illustrated in FIG. 4. The CPU 30 displays similar images to the second display section 26 at the first display section 24.

In step S108, the CPU 30 makes a determination as to whether an accelerator operation intervention has been performed. More specifically, by the functioning of the operation intervention detection section 56, when the CPU 30 detects an accelerator operation intervention on the basis of signals from the accelerator position sensor 46, the result of the determination in step S108 is affirmative and the CPU 30 proceeds to the processing of step S110.

On the other hand, when the CPU 30 does not detect an accelerator operation intervention by the functioning of the operation intervention detection section 56 in step S108, the result of the determination in step S108 is negative and the CPU 30 proceeds to the processing of step S112.

In step S110, the CPU 30 implements a display for a time of accelerator operation intervention. More specifically, by the functioning of the display change section 58, the CPU 30 changes the background color of the second display section 26 as illustrated in FIG. 5. In addition, by the functioning of the display change section 58, the CPU 30 tones down the displays of the preceding vehicle image M2 and the set speed image M5, and hides display of the speed marks M7. Further in step S110, by the functioning of the warning display section 60, the CPU 30 displays the warning image M8. Although not illustrated in the drawings, similar changes are applied to the display at the first display section 24.

In step S112, the CPU 30 makes a determination as to whether a steering operation intervention has been performed. More specifically, by the functioning of the operation intervention detection section 56, when the CPU 30 detects a steering operation intervention on the basis of signals from the steering sensor 48, the result of the determination in step S112 is affirmative and the CPU 30 proceeds to the processing of step S114.

On the other hand, when the CPU 30 does not detect a steering operation intervention by the functioning of the operation intervention detection section 56 in step S112, the result of the determination in step S112 is negative and the CPU 30 ends the display processing.

In step S114, the CPU 30 implements a display for a time of steering operation intervention. More specifically, by the functioning of the display change section 58, the CPU 30 changes the background color of the second display section 26 as illustrated in FIG. 6. In addition, by the functioning of the display change section 58, the CPU 30 hides display of the trajectory images M6 illustrating the planned running route and the speed marks M7. Further in step S114, by the functioning of the warning display section 60, the CPU 30 displays the warning image M8. Although not illustrated in the drawings, similar changes are applied to the display at the first display section 24. The CPU 30 then ends the display processing.

The state illustrated in FIG. 6 is a display when the result of the determination in step S108 is negative and the result of the determination in step S112 is affirmative. That is, FIG. 6 illustrates a display example for a situation in which there is no accelerator operation intervention but a steering operation intervention is performed. Alternatively, when the result of the determination in step S108 is affirmative and the result of the determination step S112 is affirmative, that is, when interventions by both accelerator operation and steering operation have been performed, the display of FIG. 5 and the display of FIG. 6 are combined. In this situation, by the functioning of the display change section 58, the CPU 30 changes the background color of the second display section 26 as illustrated in FIG. 5 and FIG. 6. In addition, by the functioning of the display change section 58, the CPU 30 tones down the displays of the preceding vehicle image M2 and the set speed image M5, and hides display of the trajectory images M6 illustrating the planned running route and the speed marks M7. Further, by the functioning of the warning display section 60, the CPU 30 displays the warning image M8.

As described above, in the vehicle display control device 10 according to the present exemplary embodiment, at least when the driving mode acquired by the driving mode acquisition section is the autonomous driving mode, the vicinity information display section 54 displays vicinity information of the vehicle 12 at the first display section 24 and the second display section 26. Thus, in the autonomous driving mode, a vehicle occupant may check vicinity information of the vehicle 12 by looking at the first display section 24 and the second display section 26.

In the present exemplary embodiment, when a driving operation intervention is detected by the operation intervention detection section 56, the display change section 58 changes background information of the vicinity information of the vehicle 12 displayed at the first display section 24 and second display section 26. Therefore, if a vehicle occupant unintentionally performs a driving operation during running in the autonomous driving mode, because the backgrounds of the first display section 24 and second display section 26 change, the driving operation intervention may be reported to the vehicle occupant visually. For example, if the vehicle occupant unintentionally places a foot on the accelerator pedal and presses the accelerator pedal, an alert may be given that an accelerator operation intervention has been performed.

In the present exemplary embodiment, because the alert is given to the vehicle occupant visually, disturbance of the comfort of another vehicle occupant may be suppressed compared to a configuration that frequently gives reports by voice messages.

In the present exemplary embodiment, because the vicinity information display section 54 displays the planned running route at the first display section 24 and the second display section 26, the vehicle occupant may understand the planned running route at a glance when in the autonomous driving mode. Because the display change section 58 stops display of the image M5 of the planned running route when there is a steering operation intervention, the vehicle occupant may be made aware that the steering wheel 16 has been operated.

In the present exemplary embodiment, because the vicinity information display section 54 displays the preceding vehicle image M2 at the first display section 24 and the second display section 26, the vehicle occupant may understand at a glance that there is a vehicle in front when in the autonomous driving mode. Because the display change section 58 displays the preceding vehicle image M2 with the color toned down when there is an accelerator operation intervention, the vehicle occupant may be made aware that an accelerator operation has been performed.

In the present exemplary embodiment, because the vicinity information display section 54 displays the speed marks M7 at the first display section 24 and the second display section 26, the vehicle occupant may check the speed of the vehicle 12 in the autonomous driving mode just by checking the spacing of the speed marks M7. Because the display change section 58 stops display of the speed marks M7 when there is an accelerator operation intervention, the vehicle occupant may be made aware that an accelerator operation has been performed.

In the present exemplary embodiment, because the warning image M8 is displayed at the first display section 24 and the second display section 26 by the warning display section 60, the occurrence of a driving operation intervention may be reported to the vehicle occupant effectively. When, as in the variant example illustrated in FIG. 7, the warning image is altered between a time of an accelerator operation intervention and a time of a steering operation intervention, the vehicle occupant may understand the kind of driving operation easily.

The vehicle display control device 10 according to the exemplary embodiment is described above, but it will be clear that numerous modes may be embodied within a scope that does not depart from the gist of the present disclosure. For example, in the exemplary embodiment described above, the display change section 58 is configured to change the background information of the first display section 24 and the second display section 26 when there is an accelerator operation intervention and when there is a steering operation intervention, but this is not limiting. The background information of the first display section 24 and the second display section 26 may be changed when there is an alternative driving operation. For example, the display change section 58 may change the background information of the first display section 24 and the second display section 26 when a direction indicator is operated, and the display change section 58 may change the background of the first display section 24 and the second display section 26 when a brake pedal is pressed.

In the exemplary embodiment described above, an accelerator operation intervention is detected on the basis of signals from the accelerator position sensor 46, but this is not limiting. For example, in a vehicle in which acceleration and deceleration are performed by operation of an operation section such as a button and a lever or the like instead of an accelerator pedal, an accelerator operation intervention may be detected on the basis of signals from that operation section.

In the exemplary embodiment described above, a steering operation intervention is detected on the basis of signals from the steering sensor 48, but this is not limiting. For example, in a vehicle in which steering is performed by operation of an operation section such as a button and a lever or the like instead of the steering wheel 16, a steering operation intervention may be detected on the basis of signals from that operation section.

In the exemplary embodiment described above, vicinity information of the vehicle is displayed at both the first display section 24 and the second display section 26, but this is not limiting. For example, a configuration is possible in which the vicinity information display section 54 displays the vicinity information of the vehicle only at the first display section 24.

In the exemplary embodiment described above, the display change section 58 changes the background color of the whole of the second display section 26, but this is not limiting. For example, a configuration in which the display change section 58 changes the background color of a portion of the second display section 26 may provide the same effects as the exemplary embodiment described above, provided a vehicle occupant may be alerted to a driving operation intervention.

In the exemplary embodiment described above, the display change section 58 changes the background color of the first display section 24 and the second display section 26 when there is a driving operation intervention, but this is not limiting. For example, the display change section 58 may change the background information by displaying a predetermined pattern in the backgrounds of the first display section 24 and the second display section 26 when there is a driving operation intervention.

What is claimed is:

1. A vehicle display control device comprising a processor configured to:
    acquire information regarding a vehicle indicating which of a manual driving mode or an autonomous driving mode is set as a driving mode in the vehicle, the vehicle traveling on a road via driving operations performed by a vehicle occupant in the manual driving mode, and the vehicle traveling on the road independently of driving operations by the vehicle occupant in the autonomous driving mode;
    in a case in which the acquired driving mode is the autonomous driving mode, detect a driving operation intervention by the vehicle occupant;
    in a case in which the driving operation intervention is detected, stop a driving assistance function related to an operating device by which the driving operation intervention was detected; and
    in the case in which the driving operation intervention is detected, display a warning image related to the operating device on a display provided inside a vehicle cabin of the vehicle,
    display speed marks at the display, a spacing of the speed marks changing in accordance with a speed of the vehicle,
    in a case in which an accelerator operation for the vehicle is detected, hide display of the speed marks, and
    when the speed of the vehicle is a first speed, the speed marks are displayed with a first spacing, and when the speed of the vehicle is a second speed, that is higher than the first speed, the speed marks are displayed with a second spacing that is larger than the first spacing.

2. The vehicle display control device according to claim 1, wherein the processor is configured to detect, as the driving operation intervention, at least one of a steering operation by the vehicle occupant or the accelerator operation by the vehicle occupant.

3. The vehicle display control device according to claim 2, wherein the processor is configured to display a planned running route of the vehicle at the display and, in a case in which the steering operation is detected, hide display of the planned running route.

4. The vehicle display control device according to claim 3, wherein the processor is configured to display the planned running route superposed on an image of a driving lane of the vehicle.

5. The vehicle display control device according to claim 2, wherein the processor is configured to:
    display a preceding vehicle at the display, and
    in a case in which the accelerator operation for the vehicle is detected, tone down a color of the preceding vehicle and display the preceding vehicle.

6. The vehicle display control device according to claim 2, wherein the processor is configured to, in a case in which at least one of a manual steering operation intervention or a manual accelerator operation intervention is detected, display the warning image so as to represent the steering operation or the accelerator operation at the display.

7. The vehicle display control device according to claim 6, wherein the processor is configured to display different warning images in a case in which the manual steering operation intervention is detected and in a case in which the manual accelerator operation intervention is detected.

8. A vehicle display system comprising:
    the vehicle display control device according to claim 1,
    wherein the processor is configured to display vicinity information of the vehicle on the display.

9. A vehicle display control method comprising a processor:
    acquiring information regarding a vehicle indicating which of a manual driving mode or an autonomous driving mode is set as a driving mode in the vehicle, the vehicle traveling on a road via driving operations performed by a vehicle occupant in the manual driving mode, and the vehicle traveling on the road independently of driving operations by the vehicle occupant in the autonomous driving mode;
    in a case in which the acquired driving mode is the autonomous driving mode, detecting a driving operation intervention by the vehicle occupant;
    when the driving operation intervention is detected, stopping a driving assistance function related to an operating device by which the driving operation intervention was detected; and
    when the driving operation intervention is detected, displaying a warning image related to the operating device on a display provided inside a vehicle cabin of the vehicle, displaying speed marks at the display, a spacing of the speed marks changing in accordance with a speed of the vehicle, in a case in which an accelerator operation for the vehicle is detected, hiding display of the speed marks, and when the speed of the vehicle is a first speed, displaying the speed marks with a first spacing, and when the speed of the vehicle is a second speed, that is higher than the first speed, displaying the speed marks with a second spacing that is larger than the first spacing.

10. A non-transitory storage medium storing a program executable by a computer to execute processing comprising:

acquiring information regarding a vehicle indicating which of a manual driving mode or an autonomous driving mode is set as a driving mode in the vehicle, the vehicle traveling on a road via driving operations performed by a vehicle occupant in the manual driving mode, and the vehicle traveling on the road independently of driving operations by the vehicle occupant in the autonomous driving mode;

in a case in which the acquired driving mode is the autonomous driving mode, detecting a driving operation intervention by the vehicle occupant;

when the driving operation intervention is detected, stopping a driving assistance function related to an operating device by which the driving operation intervention was detected; and when the driving operation intervention is detected, displaying a warning image related to the operating device on a display provided inside a vehicle cabin of the vehicle;

displaying speed marks at the display, a spacing of the speed marks changing in accordance with a speed of the vehicle, in a case in which an accelerator operation for the vehicle is detected, hiding display of the speed marks, and when the speed of the vehicle is a first speed, displaying the speed marks with a first spacing, and when the speed of the vehicle is a second speed, that is higher than the first speed, displaying the speed marks with a second spacing that is larger than the first spacing.

11. The vehicle display control device according to claim 1, wherein at least in a case in which the acquired driving mode is the autonomous driving mode, display vicinity information depicting an environment around the vehicle on the display provided in the vehicle cabin; and in a case in which the driving operation intervention is detected, change background information of the vicinity information and display the changed background information on the display.

12. The vehicle display control device according to claim 11, wherein an area of the background information on the display includes a portion outside of the road on which the vehicle travels, and extends to edges of the display, and wherein the background information encloses visual representations of the vehicle and the road on which the vehicle travels.

13. The vehicle display control device according to claim 12, wherein a color of the background information displayed on the display is changed in the case in which the driving operation intervention is detected.

\* \* \* \* \*